(12) United States Patent
Bronswick et al.

(10) Patent No.: US 10,272,730 B2
(45) Date of Patent: Apr. 30, 2019

(54) STRUCTURAL COMPONENT FOR A MOTOR VEHICLE

(71) Applicant: ZF Friedrichshafen AG, Friedrichshafen (DE)

(72) Inventors: Philipp Bronswick, Ostercappeln (DE); Sven Kuhlmann, Lemförde (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/517,246

(22) PCT Filed: Oct. 12, 2015

(86) PCT No.: PCT/EP2015/073501
§ 371 (c)(1),
(2) Date: Apr. 6, 2017

(87) PCT Pub. No.: WO2016/078830
PCT Pub. Date: May 26, 2016

(65) Prior Publication Data
US 2017/0305223 A1    Oct. 26, 2017

(30) Foreign Application Priority Data
Nov. 18, 2014  (DE) .................. 10 2014 223 478

(51) Int. Cl.
*B60G 3/04* (2006.01)
*B60G 7/00* (2006.01)
*F16C 7/02* (2006.01)

(52) U.S. Cl.
CPC ............... *B60G 7/001* (2013.01); *F16C 7/02* (2013.01); *B60G 2206/012* (2013.01);
(Continued)

(58) Field of Classification Search
CPC .............. B60G 7/001; B60G 2206/014; B60G 2206/017; B60G 2206/141;
(Continued)

(56) References Cited

U.S. PATENT DOCUMENTS 1,879,814 A * 9/1932 Morgan ................. F16C 7/023
29/888.09
3,121,348 A   2/1964 Reed
(Continued)

FOREIGN PATENT DOCUMENTS

DE   20 2010 008 058 U1   12/2011
DE   10 2011 053 222 A1    3/2013
(Continued)

OTHER PUBLICATIONS

International Search Report Corresponding to PCT/EP2015/073501 dated Dec. 4, 2015.
(Continued)

*Primary Examiner* — Toan C To
(74) *Attorney, Agent, or Firm* — Davis & Bujold PLLC; Michael J. Bujold

(57) ABSTRACT

A structural component for a motor vehicle, with a component body (2) made from a sheet, which includes at least one shell-shaped body portion (3) formed from the sheet and at least one receiving bush (6) formed from the sheet that extends along its circumference between first and second circumferential ends (4, 5), which at the first circumferential end (4) merges into the shell-shaped body portion (3) and at the second circumferential end (5) merges into a strengthening strip (7) formed from the sheet and attached to the shell-shaped body portion (3). The strengthening strip (7) completes the shell-shaped body portion (3) to form an at least partially closed hollow section (8).

18 Claims, 7 Drawing Sheets

(52) U.S. Cl.
CPC .. *B60G 2206/014* (2013.01); *B60G 2206/017* (2013.01); *B60G 2206/0122* (2013.01); *B60G 2206/141* (2013.01); *B60G 2206/16* (2013.01); *B60G 2206/162* (2013.01); *B60G 2206/722* (2013.01); *B60G 2206/8102* (2013.01); *B60G 2206/8103* (2013.01); *B60G 2206/8104* (2013.01); *B60G 2206/8201* (2013.01); *F16C 2326/05* (2013.01)

(58) Field of Classification Search
CPC ........ B60G 2206/162; B60G 2206/722; B60G 2206/8103; B60G 2206/8201; B60G 2206/8102; B60G 2206/16; B60G 2206/012; B60G 2206/8104; B60G 2206/0122; F16C 7/02; F16C 2326/05
USPC ................................ 280/124.128, 124.134
See application file for complete search history.

(56) References Cited

U.S. PATENT DOCUMENTS

| | | | | |
|---|---|---|---|---|
| 5,310,210 | A * | 5/1994 | Delbeke | B60G 7/001 280/124.134 |
| 5,662,348 | A * | 9/1997 | Kusama | B60G 7/001 280/124.134 |
| 6,250,657 | B1 * | 6/2001 | Valin | B21D 53/88 228/173.4 |
| 6,308,591 | B1 * | 10/2001 | Dankow | F16C 7/02 74/579 R |
| 7,159,880 | B2 * | 1/2007 | Budde | B60G 7/001 280/124.128 |
| 7,597,335 | B2 | 10/2009 | Nachbar | |
| 2011/0285102 | A1 * | 11/2011 | Yu | B60G 7/001 280/124.134 |
| 2011/0298192 | A1 * | 12/2011 | Yu | B60G 7/001 280/124.134 |
| 2012/0043735 | A1 | 2/2012 | Grauer et al. | |
| 2013/0205591 | A1 * | 8/2013 | Santini | B29D 24/002 29/897.2 |
| 2014/0210177 | A1 * | 7/2014 | Dicke | B60G 7/001 280/124.134 |
| 2016/0107494 | A1 | 4/2016 | Narita | |

FOREIGN PATENT DOCUMENTS

| | | |
|---|---|---|
| JP | S61-233214 A | 10/1986 |
| JP | H07-25215 A | 1/1995 |
| JP | H08-200418 A | 8/1996 |
| JP | H08-210408 A | 8/1996 |
| JP | 2003-002025 A | 1/2003 |
| JP | 2005-059046 A | 3/2005 |
| JP | 2010-023713 A | 2/2010 |
| WO | 2005/087520 A1 | 9/2005 |
| WO | 2014/147754 A1 | 9/2014 |

OTHER PUBLICATIONS

Written Opinion Corresponding to PCT/EP2015/073501 dated Dec. 4, 2015.

* cited by examiner

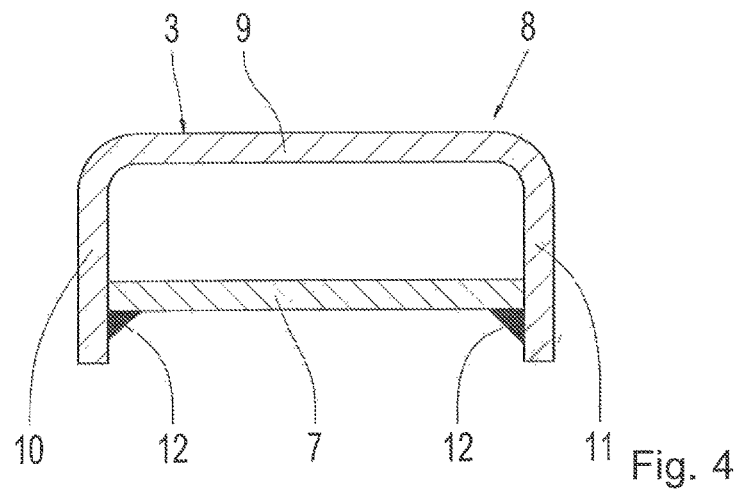
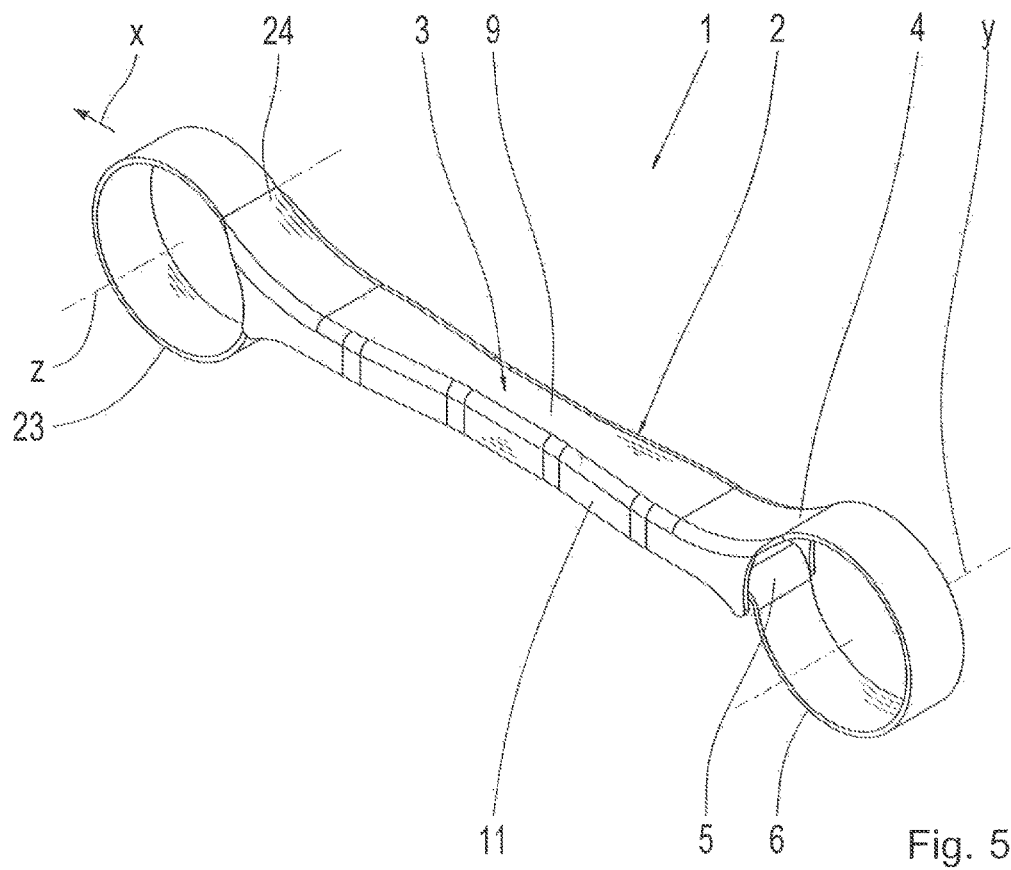

STRUCTURAL COMPONENT FOR A MOTOR VEHICLE

This application is a National Stage completion of PCT/EP2015/073501 filed Oct. 12, 2015, which claims priority from German patent application serial no. 10 2014 223 478.6 filed Nov. 18, 2014.

FIELD OF THE INVENTION

The invention concerns a structural component for a motor vehicle, with a component body formed from a sheet, which comprises at least one shell-shaped body portion made from the sheet and at least one receiving bush made from the sheet that extends along its circumference between two circumferential ends, which at one of its circumferential ends merges into the shell-shaped body portion and at the other of its circumferential ends merges into a strengthening strip made from the sheet and fixed onto the shell-shaped body portion. In addition the invention concerns a method for producing a structural component comprising a component body for a motor vehicle.

BACKGROUND OF THE INVENTION

WO 2005/087520 A1 discloses a guide link for a wheel suspension of a motor vehicle, with a link body made from at least one sheet metal component and with at least one articulation point for connection to a fixing point on the vehicle body, such that the articulation point is in the form of a circular receiving bush for an elastic bearing element. The wall of the receiving bush is formed integrally with the link body and consists of an annular bearing area and a strengthening strip fixed onto the link body. To achieve greater rigidity, the link body is made of a lower sheet and an upper sheet, the latter being welded to the lower sheet. In the unprocessed condition of the link body the receiving bush is in the form of a plate of the lower sheet and during production it is shaped in such manner as to produce both the annular bearing area and also the strengthening strip, which comes into contact with the upper side of the upper sheet and is fixed there by adhesive bonding, welding or riveting.

This has the disadvantage that both the lower and the upper sheets have to be made as separate components and then joined together.

SUMMARY OF THE INVENTION

Starting from there, the purpose of the present invention is to be able to provide a structural component of the type mentioned at the start, which has relatively high rigidity and can be produced with comparatively low manufacturing cost.

This objective is achieved by a structural component and a method according to the independent claims. Preferred further developments of the structural component and of the method are indicated in the respective subordinate claims and in the description given below.

The structural component for a motor vehicle comprises a component body made from a sheet, which comprises a shell-shaped body portion or at least one such made from the sheet, and at least one receiving bush made from the sheet which extends along its circumference between two circumferential ends, which at one of its circumferential ends merges into the shell-shaped body portion and at the other of its circumferential ends merges into a strengthening strip made from the sheet and attached to the shell-shaped body portion, wherein the strengthening strip completes the shell-shaped body portion at least in some areas to form a closed hollow section.

Since the strengthening strip completes the shell-shaped body portion at least in some areas to form a closed hollow section, the rigidity of the structural component in the area of the closed hollow section can be increased without any need for an additional sheet for that purpose. Thus, the component body can be made from only a single sheet, whereby the production cost can be reduced.

The receiving bush is in particular designed and/or made integrally with the shell-shaped body portion. Furthermore, the receiving bush is in particular designed and/or made integrally with the strengthening strip. Preferably the receiving bush is arranged between the shell-shaped body portion and the strengthening strip. Advantageously, the shell-shaped body portion merges integrally with the strengthening strip with interposition of the receiving bush. Preferably, the shell-shaped body portion, the receiving bush and the strengthening strip are made from the same sheet. In particular, the shell-shaped body portion, the receiving bush and the strengthening strip are made from a single sheet. At one of its circumferential ends the receiving bush preferably merges into the shell-shaped body portion in a material-homogeneous manner. Moreover, at its other circumferential end the receiving bush preferably merges material-homogeneously into the strengthening strip. Advantageously, the shell-shaped body portion merges into the strengthening strip with interposition of the receiving bush, in particular in a material-homogeneous manner.

Preferably, the shell-shaped body portion is in the form of an open hollow section, at least in part. More particularly, the shell-shaped body portion is in the form of a U-section, at least in part.

According to one design, the strengthening strip is attached to the shell-shaped body portion in a material-merged and/or interlocked manner. For example, the strengthening strip is attached to the shell-shaped body portion by adhesive bonding and/or welding and/or riveting. Preferably, the strengthening strip is welded to the shell-shaped body portion. In that way the strengthening strip is attached to the shell-shaped body portion in particular.

According to a further development, the shell-shaped body portion has a back and two sidepieces that extend away from it, which are connected to one another by the back. Preferably, the sidepieces are opposite one another. In particular, the sidepieces extend away from the back in the same direction or approximately the same direction. For example, the two sidepieces extend parallel or approximately parallel to one another. In particular, the sidepieces each enclose with the back a right-angle or approximately a right-angle. Preferably, the strengthening strip extends between the two sidepieces, in particular a distance away from the back. Preferably, the strengthening strip extends parallel or approximately parallel to the back.

At their sides facing away from the back the sidepieces have, in particular, free ends. According to a further development, at their free ends facing away from the back the sidepieces are bent toward one another. In particular, the bent free ends of the sidepieces extend parallel or approximately parallel to the back. Advantageously, the strengthening strip extends between the bent free ends and the back. In particular, for example with its side facing toward or away from the back, the strengthening strip is in contact with the bent free ends.

According to one design, the strengthening strip is attached to the sidepieces in a material-merged and/or interlocked manner. For example, the strengthening strip is attached to the sidepieces by adhesive bonding and/or welding and/or riveting. Preferably, the strengthening strip is welded to the sidepieces. In that way the strengthening strip is, in particular, attached to the shell-shaped body portion.

According to one design the receiving bush is ring-shaped or cylindrical. Preferably, the receiving bush is in the form of a cylinder or ring, or of an open cylinder or ring. Advantageously, the receiving bush has a parting plane between its two circumferential ends. The circumferential ends of the receiving bush preferably form the edges of the parting plane. In particular, the wall of the receiving bush is formed and/or bent from the sheet. Preferably, at one circumferential end the wall of the receiving bush merges into the shell-shaped body portion and at its other circumferential end it merges into the strengthening strip, in particular in a material-homogeneous manner.

The sheet preferably consists of metal, in particular steel, for example tempered material such as tempered steel. The sheet is deformed for example by stamping and/or deep-drawing and/or press hardening and/or bending. The component body preferably consists of metal, in particular steel, for example tempered material or metal, such as tempered steel.

The component body and/or the shell-shaped body portion extends in particular in a longitudinal direction, with the receiving bush preferably provided at one axial end of the component body and/or the shell-shaped body portion. The shell-shaped body portion extends in the longitudinal direction, preferably straight or substantially straight. Moreover, the strengthening strip preferably extends in the longitudinal direction, straight or substantially straight.

The axis of symmetry of the receiving bush extends in particular perpendicularly to the longitudinal direction. The symmetry axis of the receiving bush is preferably a central axis and/or rotational axis of the receiving bush. Preferably, the longitudinal direction and the symmetry axis of the receiving bush define a central longitudinal plane of the structural component and/or the component body. In particular, the symmetry axis of the receiving bush lies in the central longitudinal plane, which extends in the longitudinal direction. Preferably, the strengthening strip extends in, or parallel to the central longitudinal plane. Moreover, the back of the shell-shaped body portion preferably extends in, or parallel to the central longitudinal plane. Advantageously, the sidepieces of the shell-shaped body portion extend perpendicularly or approximately perpendicularly to the central longitudinal plane.

Preferably, an elastomeric bearing is inserted into the receiving bush, which is for example a rubber bearing. The elastomeric bearing preferably comprises an inner part and an elastomeric body surrounding the latter, which is for example a rubber body. The inner part preferably extends in the direction of the symmetry axis of the receiving bush. The elastomeric bearing can be inserted with its elastomeric body directly into the receiving bush. Advantageously, however, the elastomeric bearing has an outer sleeve that surrounds the elastomeric body. In that case the elastomeric bearing is preferably inserted with its outer sleeve in the receiving bush. The outer sleeve is in particular cylindrical. The symmetry axis of the outer sleeve preferably coincides with the symmetry axis of the receiving bush. The symmetry axis of the outer sleeve is in particular a central axis and/or rotational axis of the outer sleeve.

Preferably, and in particular a distance away from the receiving bush, another or at least one other elastomeric bearing and/or an articulated joint or at least one such is/are attached to the component body and/or to the shell-shaped body portion. The joint is in particular a ball joint. The other elastomeric bearing and/or the joint are provided in particular at another axial end of the component body and/or of the shell-shaped body portion. The other elastomeric bearing preferably comprises an inner part and an elastomeric body that surrounds it. Advantageously, the other elastomeric bearing also comprises an outer sleeve surrounding its elastomeric body.

According to a further development, the component body comprises a connection area formed or shaped from the sheet, which is in particular located a distance away from the receiving bush. For example, the connection area merges into the body portion, in particular in a material-homogeneous manner. Advantageously, the connection area is made and/or formed integrally with the shell-shaped body portion. Preferably, the joint is fixed onto or in the connection area. Preferably, the joint is fixed onto or in the connection area on the component body. In particular, the connection area is provided at the other axial end of the component body and/or the shell-shaped body portion. The joint preferably comprises a joint housing and an inner joint element fitted and able to move therein, which preferably extends out of the joint housing. The inner joint element is in particular a ball pin with a joint ball, which is fitted movably with its joint ball in the joint housing. Advantageously, the connection area has a fitting aperture into which the joint housing is inserted. The fitting aperture is preferably a through-going aperture.

According to a design version, the component body comprises another receiving bush formed from the sheet and extending along its circumference between two circumferential ends, which at one of its circumferential ends merges into the shell-shaped body portion and at another of its circumferential ends merges into another strengthening strip made from the sheet and attached to the shell-shaped body portion, such that the other strengthening strip completes the shell-shaped body portion at least partially, to form a closed hollow section. The receiving bushes are in particular arranged a distance from one another. Advantageously, the other receiving bush is provided at the other axial end of the component body and/or the shell-shaped body portion. Preferably, the other—or another—elastomeric bearing is inserted into the other receiving bush.

In a further development, the component body comprises a second shell-shaped body portion formed from the sheet, and a second receiving bush formed from the sheet and extending along its circumference between two circumferential ends, which at one of its circumferential ends merges into the second shell-shaped body portion and at another of its circumferential ends merges into a second strengthening strip formed form the sheet and attached to the second shell-shaped body portion, such that the second strengthening strip completes the second shell-shaped body portion at least partially to form a closed hollow section. In particular, the receiving bushes are arranged a distance from one another. Preferably, a second elastomeric bearing is inserted into the second receiving bush. Preferably, the two shell-shaped body portions merge into one another, particularly in a material-homogeneous manner. Advantageously, the two shell-shaped body portions are made and/or formed integrally with one another. The second elastomeric bearing preferably comprises an inner part and an elastomeric body surrounding it. Preferably, the second elastomeric bearing also has an outer sleeve surrounding its elastomeric body.

In another further development, a distance away from the receiving bushes the joint is attached to the component body.

In particular, the connection area is provided a distance away from the receiving bushes. Preferably, the joint and the receiving bushes define the corners of a triangle. Advantageously, the connection area merges into the shell-shaped body portion, in particular in a material-homogeneous manner. Preferably, the connection area is made and/or formed integrally with the shell-shaped body portion.

The structural component forms in particular a link rod, a pendulum support or a control arm for a wheel suspension and/or axle suspension of a motor vehicle. The control arm is for example a wishbone. In particular, the structural component is or is intended to be built into a wheel suspension or axle suspension of a motor vehicle. Advantageously, the structural component is or is intended to be connected by means of the elastomeric bearing to a vehicle component. The vehicle component is for example a chassis component or a vehicle body of the motor vehicle. Preferably, the structural component is or is intended to be connected by means of the other or second elastomeric bearing to the vehicle component or to another vehicle component. The other vehicle component is for example another chassis component of the motor vehicle. Preferably, the structural component is or is intended to be connected by means of the joint to a further vehicle component. The further vehicle component is for example a further chassis component or the vehicle body of the motor vehicle.

The invention also concerns a method for producing a structural component for a vehicle, comprising a component body, such that to form the component body a sheet is deformed into a blank with a—or at least one—shell-shaped body portion, a—or at least one—intermediate area of the blank adjacent to the shell-shaped body portion shaped, particularly by bending, to form a receiving bush, and an end area of the blank adjacent to the intermediate area and/or the receiving bush, to which the shell-shaped body portion is attached so as to form a strengthening strip, wherein the end area of the blank is attached to the shell-shaped body portion in such manner that the strengthening strip completes the shell-shaped body portion at least partially to form a closed hollow section.

The structural component described is made in particular in accordance with the method and can be developed further in accordance with all the design versions explained in connection with the method. Furthermore, the method can be developed further in accordance with all the design versions explained in connection with the structural component.

Preferably, when deforming the sheet to produce the blank, the shell-shaped body portion is at least in part deformed to make a hollow section. In particular, when deforming the sheet to produce the blank, the shell-shaped body portion is at least in part formed into a U-shaped profile.

In one version the end area of the blank is attached to the shell-shaped body portion in a material-merged and/or interlocked manner. For example, the end area of the blank is attached to the shell-shaped body portion by bonding and/or welding and/or riveting. Preferably, the end area of the blank is welded to the shell-shaped body portion. In that way the end area of the blank is attached in particular to the shell-shaped body portion.

According to a further development, when the sheet is deformed to produce the blank the shell-shaped body portion is provided with a back and with two sidepieces extending away therefrom, which are connected to one another by the back Preferably, the sidepieces are opposite one another. In particular, the sidepieces extend away from the back in the same direction or approximately the same direction. For example, the two sidepieces extend parallel or approximately parallel to one another. Advantageously, the sidepieces each enclose with the back a right-angle or approximately a right-angle. Preferably, the end area of the blank is positioned in the space between the two sidepieces, in particular a distance away from the back. Preferably, the end area of the blank is positioned in the space between the two sidepieces in such manner that it extends parallel or approximately parallel to the back.

In one version the end area of the blank is attached to the sidepieces in a material-merged and/or interlocked manner. For example, the end area of the blank is attached to the sidepieces by bonding and/or welding and or riveting. Preferably, the end area of the blank is welded to the sidepieces. In that way the end area of the blank is in particular attached to the shell-shaped body portion.

The receiving bush is preferably made and/or formed as a ring or a cylinder, in particular by bending. In one design the intermediate area of the blank is deformed and/or bent into a ring or cylinder that forms the receiving bush. Preferably, the intermediate area of the blank is deformed and/or bent to produce the receiving bush in the form of a cylinder or ring, or an open cylinder or an open ring. In particular, the intermediate area of the blank is deformed and/or bent to produce the receiving bush in such manner that the receiving bush extends along its circumference between two circumferential ends. The receiving bush preferably merges at one of its circumferential ends into the shell-shaped body portion, and at another of its circumferential ends into the strengthening strip and/or the end area of the blank. Advantageously, the intermediate area of the blank is bent to form the receiving bush in such manner that the receiving bush has a parting plane between its two circumferential ends. The circumferential ends of the receiving bush preferably form the edges of the parting plane.

The sheet is preferably made from metal, in particular steel. For example the sheet is made from a tempered material or metal, such as tempered steel. The sheet is deformed to make the blank for example by stamping and/or deep-drawing and/or press hardening and/or bending.

The sheet is preferably shaped to form the blank in such manner that the blank and/or the shell-shaped body portion extends in a longitudinal direction. In particular the component body and/or the shell-shaped body portion are designed such that, for example during the deformation of the sheet to form the blank, the component body and/or the shell-shaped body portion extend in the, or in a longitudinal direction. In particular the end area of the blank is attached to the shell-shaped body portion in such manner that the receiving bush forms an axial end of the blank and/or the component body and/or the shell-shaped body portion. During the deformation of the sheet to form the blank, the shell-shaped body portion in particular is formed in such manner that it extends straight or substantially straight in the longitudinal direction. Furthermore, in particular the end area of the blank is attached to the shell-shaped body portion in such manner that it extends straight or substantially straight in the longitudinal direction.

Preferably, the intermediate area of the blank is deformed and/or bent to form the receiving bush in such manner that its axis of symmetry is perpendicular to the longitudinal direction. The symmetry axis of the receiving bush is preferably a central axis and/or rotational axis of the receiving bush. In particular, the longitudinal direction and the symmetry axis of the receiving bush define a central longitudinal plane of the structural component and/or the component body. Preferably, the symmetry axis of the receiving bush lies in the central longitudinal plane, which extends in the longitudinal direction. Preferably, the end area of the blank is attached to the shell-shaped body portion in such manner that it extends in or parallel to the central longitudinal plane. During the deformation of the sheet to form the blank, the shell-shaped body portion in particular is formed such that the back extends in or parallel to the central longitudinal plane. Advantageously, during the deformation of the sheet to form the blank, the sidepieces are formed in such manner that they extend perpendicularly or approximately perpendicularly to the central longitudinal plane.

Preferably, into the receiving bush an elastomeric bearing is inserted, which for example is a rubber bearing. The elastomeric bearing is preferably formed of an inner part and an elastomeric body surrounding it, for example a rubber body. Preferably, the elastomeric bearing is inserted into the receiving bush in such manner that the inner part extends in the direction of the symmetry axis of the receiving bush. The elastomeric bearing can be inserted directly, with its elastomeric body, into the receiving bush. Advantageously, however, the elastomeric bearing is provided with an outer sleeve that surrounds the elastomeric body. In that case the elastomeric bearing is preferably inserted into the receiving bush together with its outer sleeve. In particular, the outer sleeve is cylindrical. Preferably, the elastomeric bearing is inserted into the receiving bush and/or the elastomeric bearing is provided with its outer sleeve in such manner that the symmetry axis of the outer sleeve coincides with the symmetry axis of the receiving bush. The symmetry axis of the outer sleeve is in particular a central and/or a rotational axis of the outer sleeve.

Preferably, and particularly a distance away from the receiving bush, one or at least one other elastomeric bearing and/or one or at least one joint are attached to the component body and/or to the shell-shaped body portion. The joint is in particular a ball joint. The other elastomeric bearing and/or joint is in particular positioned at another axial end of the component body and/or the shell-shaped body portion. The other elastomeric bearing preferably consists of an inner part and an elastomeric body surrounding it. Advantageously, the other elastomeric bearing is also provided with an outer sleeve around the elastomeric body.

In a further development, the blank and/or the component body is provided with a connection area made or formed from the sheet, in particular a distance away from the receiving bush. Preferably, the joint is fixed onto or in the connection area. Preferably, the joint is fixed onto or in the connection area on the component body. In particular, the connection area is located at the other axial end of the blank and/or the component body and/or the shell-shaped body portion. The joint is preferably formed of a joint housing and an inner joint element which is fitted and able to move in the joint housing and which preferably extends out of it. The inner joint element is in particular a ball pin comprising a joint ball, which is fitted movably into the joint housing. Advantageously, the connection area is provided with a fitting aperture into which the joint housing is inserted. The fitting aperture is preferably a through-going aperture.

BRIEF DESCRIPTION OF THE DRAWINGS

Below, the invention is described with reference to preferred embodiments related to the drawing, which shows:

FIG. 4: A cross-section through the structural component according to the first embodiment, along the section line 4-4 shown in FIG. 2, FIG. 5: A perspective view of a structural component according to a second embodiment.

DETAILED DESCRIPTION OF THE PREFERRED EMBODIMENTS

Figure 1:
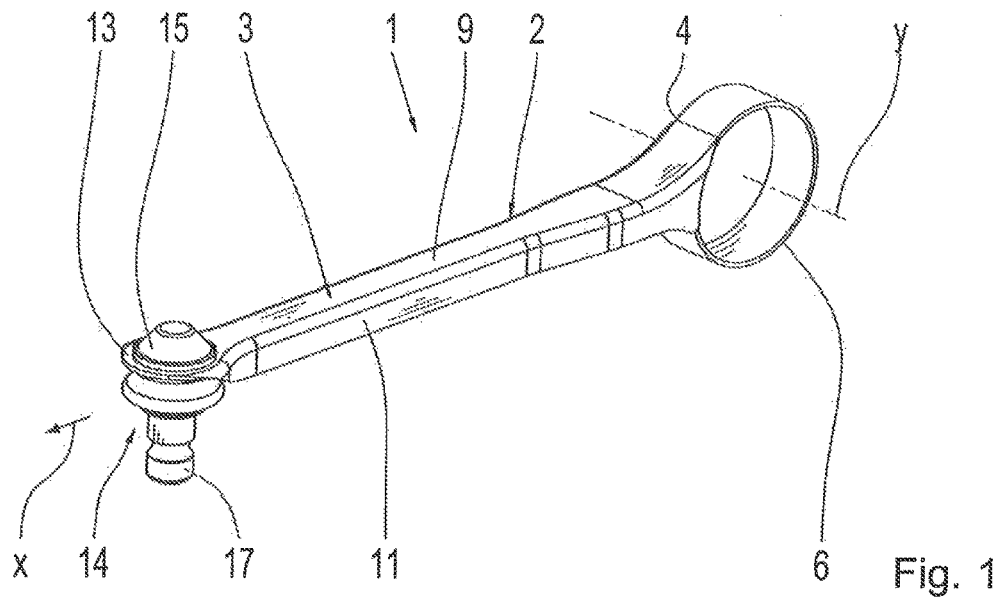
FIG. 1: A perspective view of a structural component according to a first embodiment.
Figure 2:
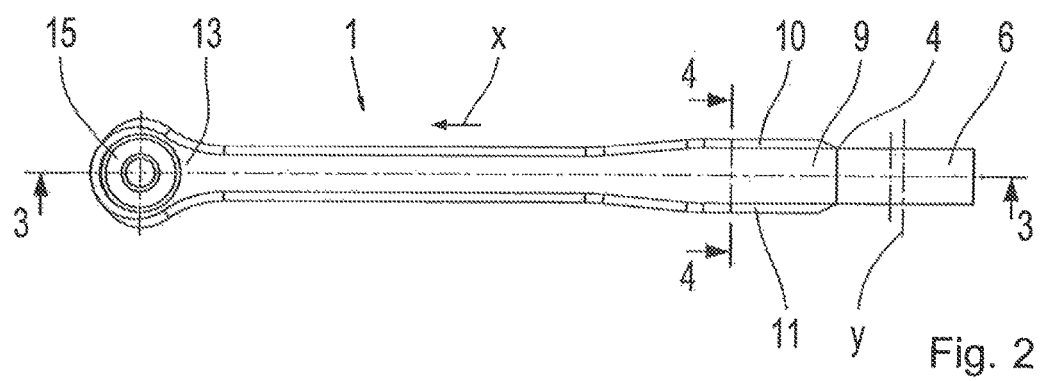
FIG. 2: A view of the structural component of FIG. 1, seen from above.
Figure 3:
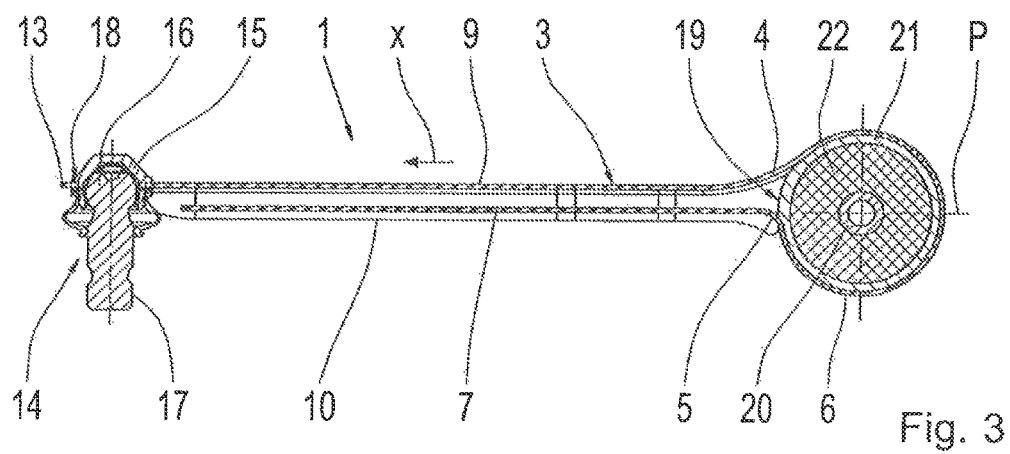
FIG. 3: A longitudinal section through the structural component according to the first embodiment, along the section line 3-3 shown in FIG. 2, with a rubber bearing inserted.

FIGS. 1 to 4 show various views and partial views of a structural component 1 according to a first embodiment, wherein FIG. 1 shows a perspective view of the structural component 1, FIG. 2 a view of the structural component 1 seen from above, FIG. 3 a longitudinal section through the structural component 1 along the section line 3-3 in FIG. 2, and FIG. 4 a cross-section through the structural component 1 along the section line 4-4 shown in FIG. 2. The structural component 1 has a rod-shaped component body 2 formed from a sheet, which extends in a longitudinal direction x. The component body 22 comprises a shell-shaped body portion 3 made from the sheet and, also made form the sheet, a receiving bush 6 that extends along its circumference between two circumferential ends 4 and 5, which at its circumferential end 4 merges into the shell-shaped body portion 3 and at its circumferential end 5 merges into a strengthening strip 7 formed from the sheet and attached to the shell-shaped body portion 3, which strip completes the shell-shaped body portion 3 over most of its longitudinal extension in the direction x to form a closed hollow section 8 which can be seen in cross-section in FIG. 4. In addition, it can be seen from FIG. 4 that the shell-shaped body portion 3 forms an open hollow section in the shape of a U-section, which comprises a back 9 and two sidepieces 10 and 11, these being connected to one another by the back 9. To form the hollow section 8, the two sidepieces 10 and 11 are additionally connected to one another by the strengthening strip 7, which for that purpose is welded to the sidepieces 10 and 11, the associated weld seams being indexed 12. In the area of the hollow section 8 the strengthening strip 7 extends parallel to the back 9 and is arranged between the sidepieces 10 and 11.

The receiving bush 6 is of cylindrical shape, positioned at one axial end of the component body 2 with the axis of symmetry y of the receiving bush 6 extending perpendicularly to the longitudinal direction x. Moreover, it can be seen from FIG. 3 that the strengthening strip 7 extends in a schematically indicated central longitudinal plane P, which is defined by the symmetry axis y and the longitudinal direction x. At its other axial end the component body 2 has a connection area 13 made from the sheet and provided with a through-going fitting aperture 18, in which aperture a ball joint 14 is fixed to the component body 2. The ball joint 14 comprises a joint housing 15 that is fitted into the fitting aperture 18 and a ball pin 17 with a joint ball 16, which with its joint ball 16 is fitted and can move in the joint housing 15 and which extends outward therefrom. The connection area 13 merges into the shell-shaped body portion 3, which extends substantially straight in the longitudinal direction x from the receiving bush 6 to the connection area 13. As can be seen from FIGS. 1 to 4, The entire component body 2 is formed from a single sheet.

FIG. 3 also shows a rubber bearing 19 inserted into the receiving bush 6, which bearing comprises an inner part 20, an outer sleeve 21 surrounding the inner part 20 and a rubber body 22 between the inner part 20 and the outer sleeve 21. Although the rubber bearing 19 is not shown in FIGS. 1 and 2, it can also be present there.

Figure 6:
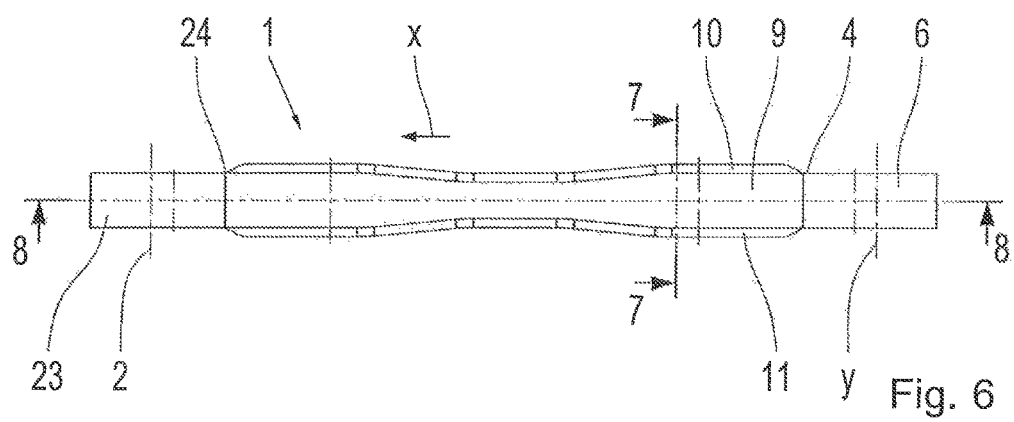
FIG. 6: A view of the structural component of FIG. 5, seen from above.
Figure 7:
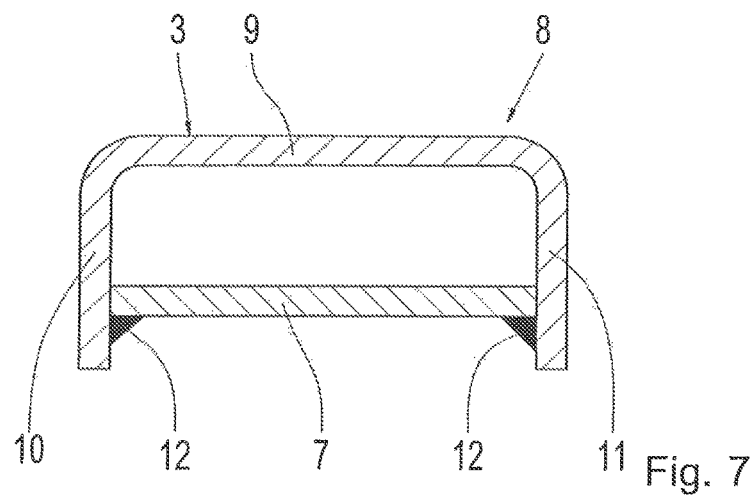
FIG. 7: A cross-section through the structural component according to the second embodiment, along the section line 7-7 shown in FIG. 6, FIG. 8: A schematic longitudinal section through the structural component according to the second embodiment, along the section line 8-8 shown in FIG. 6, FIG. 9: A perspective view of a structural component according to a third embodiment.
Figure 8:
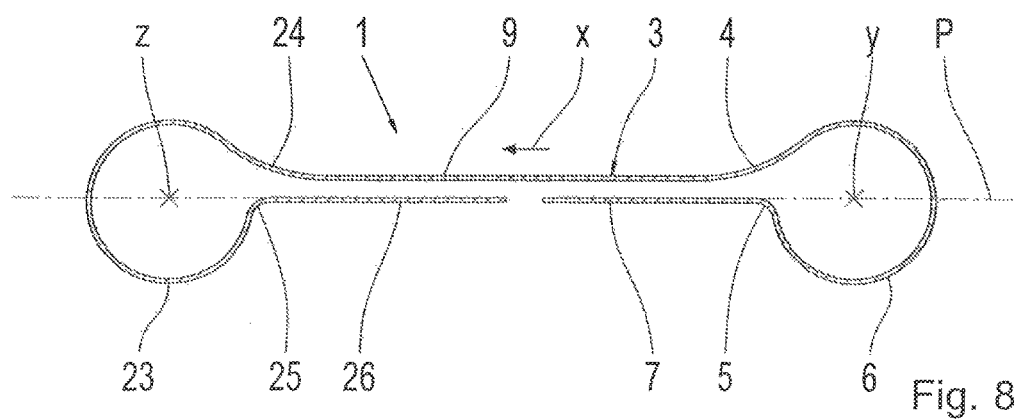

FIGS. 5 to 8 show various views and partial views of a structural component 1 according to a second embodiment; in these figures, features identical or similar to those of the first embodiment are given the same indexes as in the first embodiment. FIG. 5 shows a perspective view of the structural component 1, FIG. 6 shows a view of the structural component 1 seen from above, FIG. 7 shows a cross-section through the structural component 1 along the section line 7-7 in FIG. 6, and FIG. 8 shows a schematic representation of a longitudinal section through the structural component 1 along the section line 8-8 in FIG. 6.

Otherwise than in the first embodiment, the strengthening strip 7 completes the shell-shaped body portion 3 from the first axial end only over almost half its longitudinal extension to form the closed hollow section 8. This can be seen from the schematic longitudinal section in FIG. 8, in which the sidepiece 10 has been omitted. Furthermore, at the other axial end of the component body 2, instead of a ball joint another receiving bush 23 formed from the sheet is provided, which is made analogously to the receiving bush 6. The receiving bush 23 extends along its circumference between two circumferential ends 24 and 25, such that at its circumferential end 24 the receiving bush 23 merges into the shell-shaped body portion 3 and at its circumferential end 25 it merges into a strengthening strip 26 formed from the sheet and attached to the body portion 3, which strip completes the shell-shaped body portion 3 from the other axial end over almost half its longitudinal extension to form a closed hollow section. The receiving bush 23 is of cylindrical shape, with the symmetry axis z of the receiving bush 23 extending perpendicularly to the longitudinal direction x. Furthermore, the symmetry axis z is parallel to the symmetry axis y and lies in the central longitudinal plane P. Analogously to the strengthening strip 7, the strengthening strip 26 is welded to the sidepieces 10 and 11 of the body portion 3.

Apart from these differences the second embodiment is essentially the same as the first embodiment, so that for any more detailed description of the second embodiment reference should be made to the description of the first embodiment. In particular, the entire component body 2 in the second embodiment is again made from a single sheet. Moreover, in particular rubber bearings are inserted into each of the receiving bushes 6 and 23.

Figure 9:
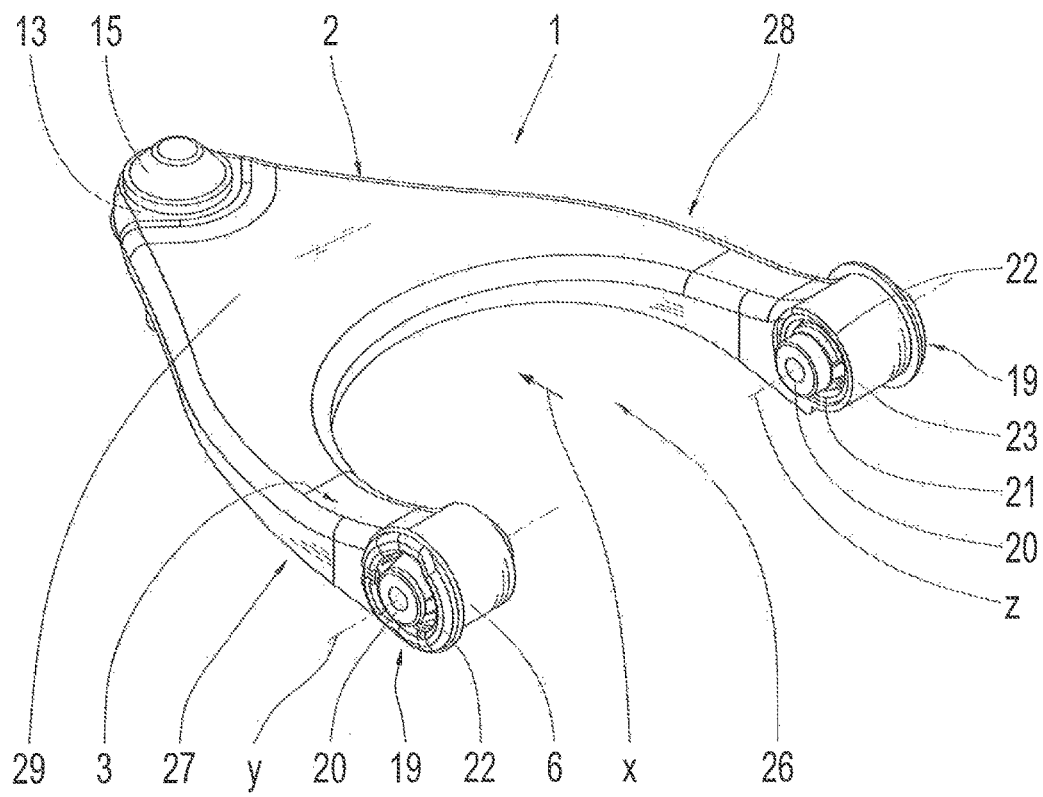
Figure 10:
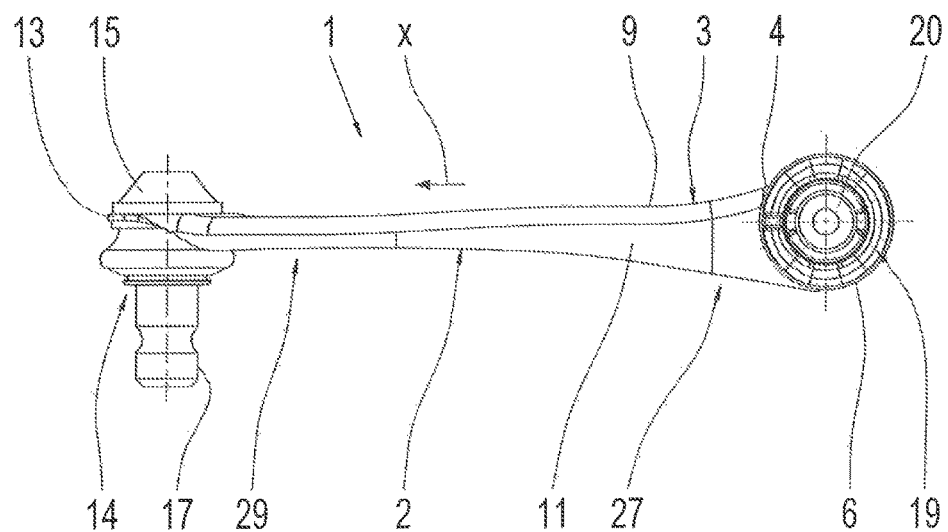
FIG. 10: A side view of the structural component in FIG. 9, FIG. 11: A view of the structural component of FIG. 9, seen from above.
Figure 11:
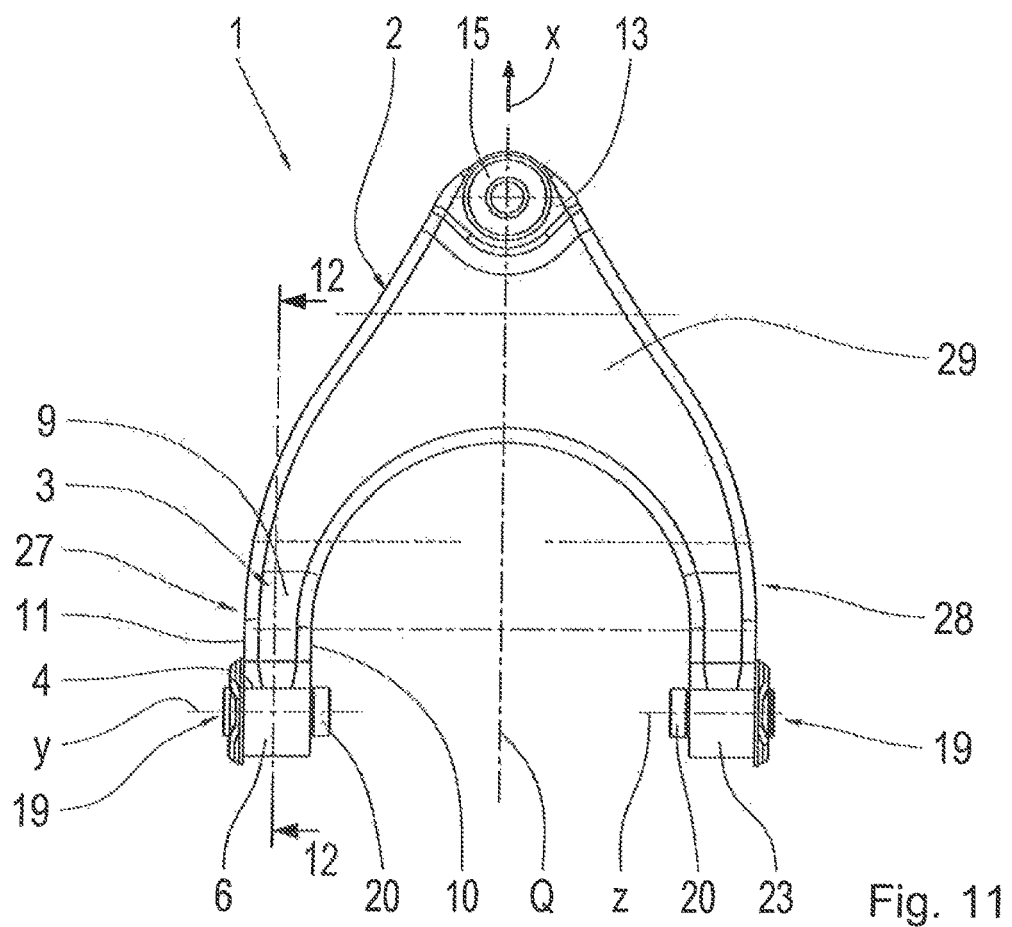
Figure 12:
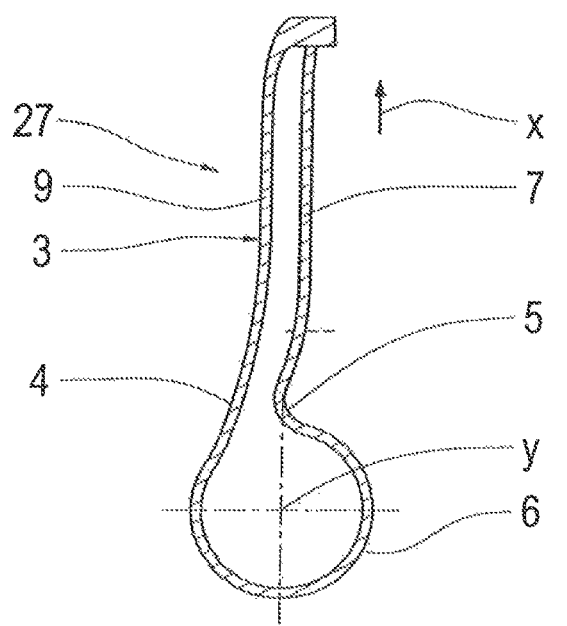
FIG. 12: A schematic longitudinal section through the structural component according to the third embodiment, along the section line 12-12 shown in FIG. 11, FIG. 13: A perspective view of a blank formed from a sheet, for producing the structural component according to the third embodiment.

FIGS. 9 to 12 show various views and partial views of a structural component 1 according to a third embodiment, wherein features identical with or similar to those of the previous embodiments are indexed in the same way as in the previous embodiments. FIG. 9 shows a perspective view of the structural component 1, FIG. 10 shows a side view of the structural component 1, FIG. 11 shows the structural component 1 as seen from above, and FIG. 12 shows a schematic representation of a longitudinal section through the structural component 1 along the section line 12-12 in FIG. 11.

Otherwise than in the previous embodiments, the component body 2 formed from a sheet comprises two receiving bushes 6 and 23 formed from the sheet for holding rubber bearings, and a connection area 13 formed from the sheet for holding a ball joint. Furthermore, the component body 2 has two arms 27 and 28 formed from the sheet, which extend in the longitudinal direction x, which arms merge in to a central area 29 of the component body 2 formed from the sheet, which contains the connection area 13, whereas at the free ends of the arms 27 and 28, respectively, one of the receiving bushes 6 or 23 is arranged. The symmetry axes y and z of the cylindrical receiving bushed 6 and 23 extend transversely to the longitudinal direction x and in this third embodiment are coincident with one another.

In the connection area 13 is arranged a ball joint 14 comprising a joint housing 15 fixed to the component body 2 in the connection area 13, in which housing 15 a ball pin 17, extending outward therefrom, is fitted and able to move. In addition, in each of the receiving bushes 6 and 23 a rubber bearing 19 is inserted, which in each case comprises an inner part 20, an outer sleeve 21 surrounding the inner part 20 and a rubber body 22 between the inner part 20 and the outer sleeve 21.

Since, relative to a symmetry plane Q that extends in the longitudinal direction x and transversely to the symmetry axes y and z, the arms 27 and 28 are designed mirror-symmetrically, only the arm 27 will be described below.

The arm 27 comprises a shell-shaped body portion 3 formed from the sheet and the receiving bush 6 that extends along its circumference between two circumferential ends 4 and 5, which at its circumferential end 4 merges into the shell-shaped body portion 3 and at its circumferential end 5 merges into a strengthening strip 7 formed from the sheet and attached to the shell-shaped body portion 3, which strip completes the shell-shaped body portion 3 at least partially to form a closed hollow section. This can be seen from the longitudinal section shown schematically in FIG. 12. The shell-shaped body portion 3 is at least partially in the form of an open, hollow, U-shaped section, which comprises a back 9 and two sidepieces 10 and 11 connected to one another by the back 9. To form the hollow section, the two sidepieces 10 and 11 are connected to one another by the strengthening strip 7, which for that purpose is welded to the sidepieces 10 and 11.

Figure 13:
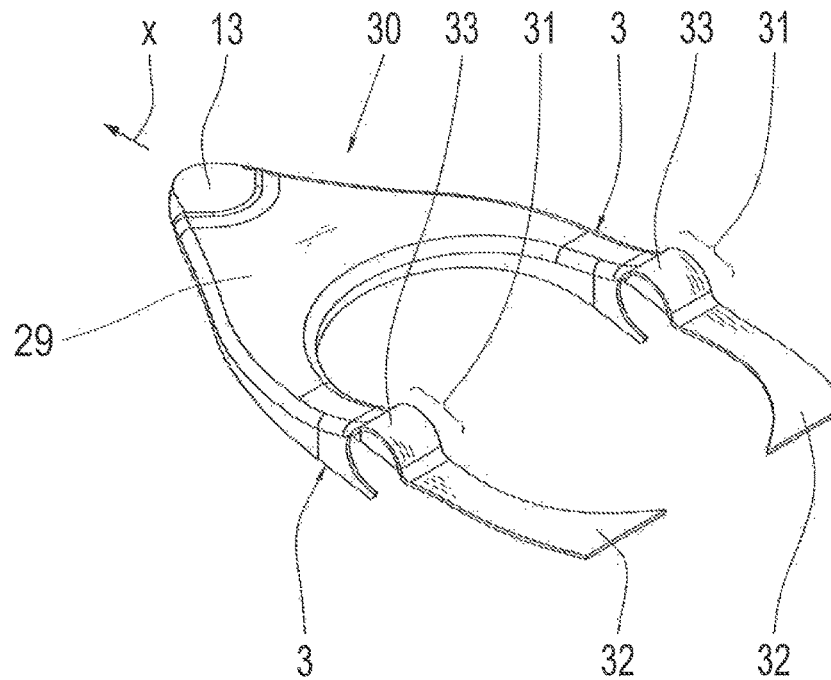
Figure 14:
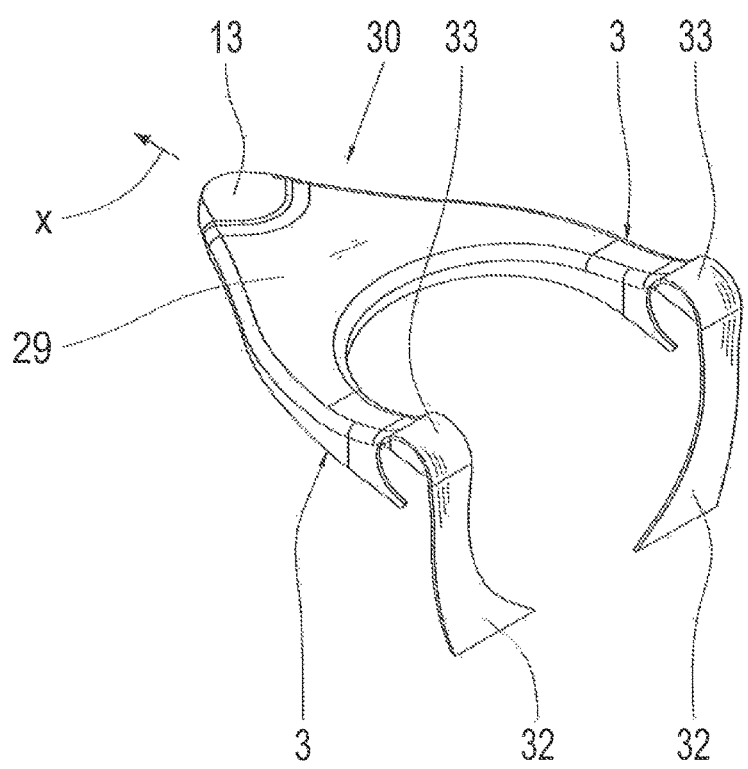
FIG. 14: A perspective view of the blank during a bending process.

Referring now to FIGS. 13 and 14, the production of the component body 2 of the structural component 1 according to the third embodiment will be described below. By deforming a sheet, a blank 30 of the component body 2 is formed, a perspective view of which is shown in FIG. 13.

Figure 15:
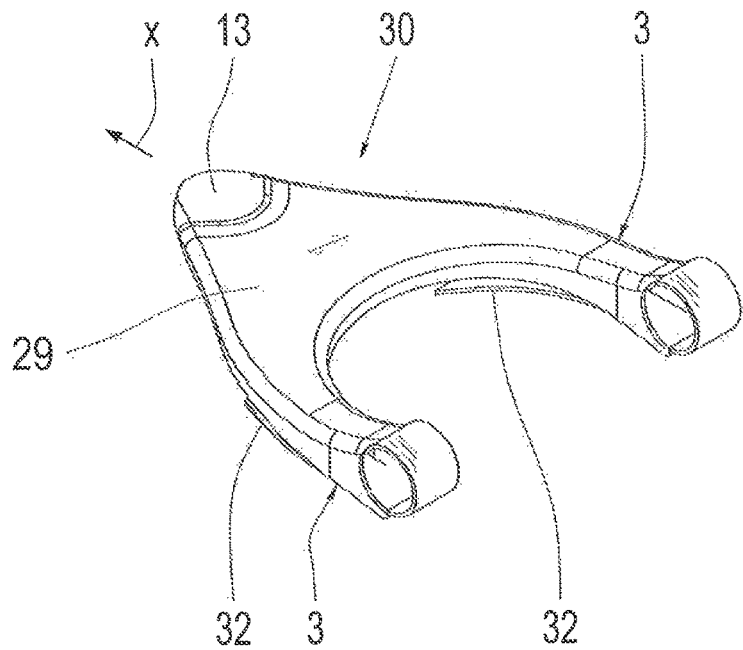
FIG. 15: A perspective view of the blank at a later stage of the bending process.
Figure 16:
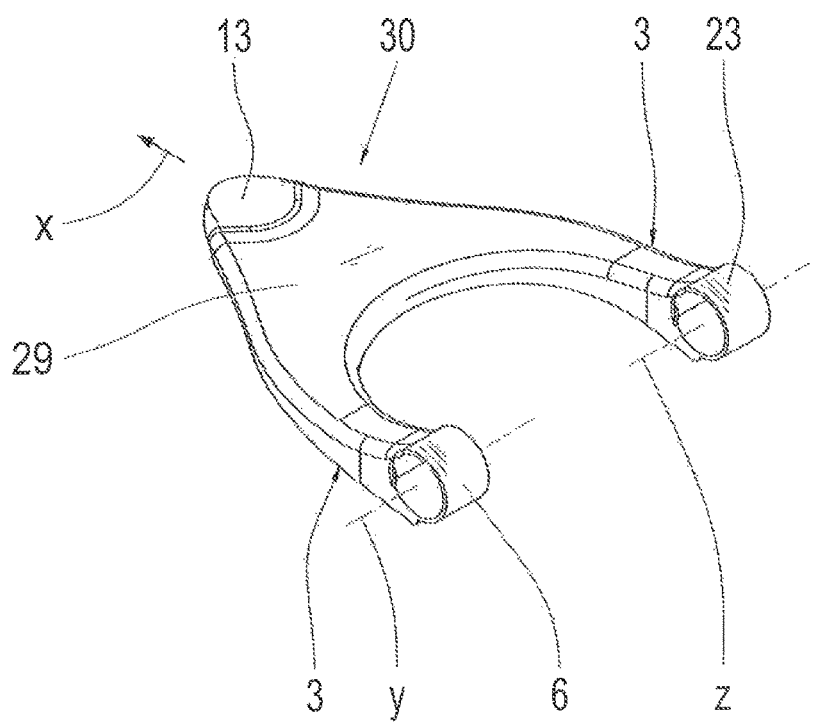
FIG. 16: A perspective view of the blank at the end of the bending process.

The blank 30 already has the shell-shaped body portion 3, the arms 27 and 28 and the central area 29 of the component body 2 to be produced. Furthermore, the blank 30 also already has the connection area 13, in which, however, a fitting aperture for inserting the joint housing 15 of the ball joint 14 still has to be made. To each of the shell-shaped body portions 3 there is connected an intermediate area 31, followed in each case by an end area 32. Each intermediate area 31 is, in a section 33 facing toward the central area 29, already of curved shape. To form the receiving bushes the intermediate areas 31 are now bent, taking the end areas 31 with them. This can be seen from FIGS. 14 and 15, in which FIG. 15 shows the bending process at a later stage than FIG. 14. After the bending process has been completed, the receiving bushes 6 and 23 have been formed completely, as shown in FIG. 16. Moreover, each end area 32 is bent back over its respective shell-shaped body portion 3 and is welded thereto, so that each end area 32 completes the associated shell-shaped body portion 3 to form a hollow section. Thus, the end areas 32 now form the strengthening strips. Finally the rubber bearings 19 are inserted into the receiving bushes 6 and 23, a fitting aperture is made in the connection area 13 and the ball joint 14 is fitted into the connection area 13, so that the structural component 1 according to FIG. 9 is produced.

INDEXES

1 Structural component
2 Component body
3 Shell-shaped body portion
4 Circumferential end of the receiving bush
5 Circumferential end of the receiving bush
6 Receiving bush
7 Strengthening strip
8 Hollow section
9 Back of the shell-shaped body portion
10 Sidepiece of the shell-shaped body portion
11 Sidepiece of the shell-shaped body portion
12 Weld seam
13 Connection area
14 Ball joint
15 Housing of the ball joint
16 Joint ball of the ball pin
17 Ball pin of the ball joint
18 Fitting aperture is the connection area
19 Rubber bearing
20 Inner part of the rubber bearing
21 Outer sleeve of the rubber bearing
22 Rubber body of the rubber bearing
23 Receiving bush
24 Circumferential end of the receiving bush
25 Circumferential end of the receiving bush
26 Strengthening strip
27 Arm of the component body
28 Arm of the component body
29 Central area of the component body
30 Blank for the component body
31 Intermediate area of the blank
32 End area of the blank
33 Section of the intermediate area
P Central longitudinal plane
Q Plane of symmetry
x Longitudinal direction
y Symmetry axis
z Symmetry axis

The invention claimed is:

1. A structural component for a motor vehicle, the structural component comprising:
a component body being made from a sheet, the component body comprises at least one shell-shaped body portion formed from the sheet and at least one receiving bush formed from the sheet, the at least one receiving bush forming an open cylinder, which defines a symmetry axis, and extending about a circumference between first and second circumferential ends, the at least one receiving bush merges, at the first circumferential end thereof, into a back of the shell-shaped body portion and merges, at the second circumferential end thereof, into a strengthening strip formed from the sheet and attached to the shell-shaped body portion,
the shell-shaped body portion extending in a longitudinal direction of the structural component and comprising the back and two sidepieces, the two sidepieces being connected to and extending from laterally opposite sides of the back,
the strengthening strip having laterally opposite sides that are respectively connected the two sidepieces such that the strengthening strip at least partially completes the shell-shaped body portion to form a closed hollow section, and
an axial end of the two being connected to the back at the first circumferential end of the at least one receiving bush and connected to the strengthening strip at the second circumferential end of the at least one receiving bush.

2. The structural component according to claim 1, wherein the shell-shaped body portion is at least partially in the form of an open hollow section.

3. The structural component according to claim 1, wherein the strengthening strip is welded to the shell-shaped body portion.

4. The structural component according to claim 1, wherein in an area adjacent the at least one receiving bush, the two sidepieces extend in the longitudinal direction of the structural component and perpendicular to the symmetry axis of the at least one receiving bush.

5. The structural component according to claim 4, wherein the strengthening strip extends parallel to the back.

6. The structural component according to claim 4, wherein the strengthening strip is welded to the sidepieces.

7. The structural component according to claim 1, wherein the shell-shaped body portion has at least partially a U-shaped profile.

8. The structural component according to claim 1, wherein the at least one receiving bush has a cylindrical shape.

9. The structural component according to claim 1, wherein an elastomeric bearing is fitted into the at least one receiving bush.

10. The structural component according to claim 9, wherein the component body comprises a further receiving bush that is spaced away from the at least one receiving bush.

11. The structural component according to claim 10, wherein, the further receiving bush forming an open cylinder that defines a symmetry axis, and the at least one receiving bush and the further receiving bush being aligned such that symmetry axes thereof are collinear.

12. The structural component according to claim 1, wherein the component body extends in the longitudinal direction of the structural component and the at least one receiving bush is provided at one axial end of the component body.

13. A method of producing a structural component for a motor vehicle, which component comprises a component body, the method comprising:
- forming the component body by deforming a sheet into a blank having at least one shell-shaped body portion;
- deforming the blank such that the shell-shaped body portion comprises back piece and two side pieces that extend perpendicularly from laterally opposite sides of the back piece;
- deforming at least one intermediate area of the blank connected with the shell-shaped body portion to produce a receiving bush having a form of an open cylinder, an end of the back piece of the shell-shaped body portion forming a first circumferential end of the receiving bush;
- deforming an end area of the blank, connected to the intermediate area, to produce a strengthening strip, and an end of the strengthening strip forming a second circumferential end of the receiving bush; and
- attaching laterally opposite sides of the strengthening strip to the two side pieces of the shell-shaped body portion in such manner that the strengthening strip completes the shell-shaped body portion at least partially to form a closed hollow section, and such that an axial end of the two side pieces is connected to the back piece of the shell-shaped body portion at the first circumferential end of the receiving bush, and is connected to the strengthening strip at the second circumferential end of the receiving bush.

14. The method according to claim 13, further comprising fitting an elastomeric bearing into the receiving bush.

15. The method according to claim 13, wherein attaching either a joint or other elastomeric bearing to the component body at a location spaced away from the receiving bush.

16. A structural component for a motor vehicle, the structural component comprising:
- a component body extending in a longitudinal direction and being made from a metallic sheet, the component body comprising at least one shell-shaped body portion, at least one receiving bush and a strengthening strip which are each formed from the metallic sheet, the receiving bush having a form of an open cylinder comprising first and second circumferential ends,
- the shell-shaped body portion having a back piece and two side pieces that extend perpendicularly from opposite lateral sides of the back piece,
- a first longitudinal end of the back piece of the shell-shaped body portion merging into the first circumferential end of the receiving bush and a first longitudinal end of the strengthening strip merging into the second circumferential end of the receiving bush,
- the receiving bush defining an axis that is normal to the longitudinal direction,
- the strengthening strip and the shell-shaped body portion being fixed to one another to form a closed hollow section, and
- a first longitudinal end of the two side pieced is connected to the first longitudinal end of the back piece of the shell-shaped body portion and the first circumferential end of the receiving bush, and is connected to the first longitudinal end of the strengthening strip and the second circumferential end of the receiving bush.

17. The structural component according to claim 16, wherein the two side pieces extend from the opposite lateral sides of the back piece parallel to each other such that the shell-shaped body portion has a U-shaped cross-section, and the first longitudinal ends of the two side pieces have an arcuate profile that corresponds to a circumference of the receiving bush.

18. The structural component according to claim 17, wherein the strengthening strip is welded to the two side pieces of the shell-shaped body portion such that the U-shaped cross-section of the shell-shaped body portion at least partially encloses a hollow section.

* * * * *